United States Patent [19]

Gartner et al.

[11] Patent Number: 5,054,350
[45] Date of Patent: Oct. 8, 1991

[54] KEY PUNCH MACHINE

[75] Inventors: Klaus W. Gartner, Palos Verdes Estates; Alan K. Uyeda, Rosemead, both of Calif.

[73] Assignee: H.P.C., Inc., Schiller Park, Ill.

[21] Appl. No.: 412,016

[22] Filed: Sep. 25, 1989

[51] Int. Cl.⁵ .............................................. B26F 1/12
[52] U.S. Cl. ................................. 83/414; 83/522.18; 83/628; 83/917
[58] Field of Search ................ 83/413, 414, 917, 628, 83/522.18; 409/81, 82

[56] References Cited

U.S. PATENT DOCUMENTS

| 2,051,139 | 8/1936 | Griffith | 83/414 |
| 2,812,816 | 11/1957 | Hoffman | |
| 3,981,214 | 9/1976 | Wich | 83/414 |
| 4,012,991 | 3/1977 | Uyeda | 409/81 |
| 4,019,415 | 4/1977 | Wich | 83/413 |
| 4,062,261 | 12/1977 | Stahl | 83/414 |
| 4,090,303 | 5/1978 | Uyeda | 33/539 |
| 4,117,763 | 10/1978 | Uyeda | 409/82 |

Primary Examiner—Mark Rosenbaum
Assistant Examiner—Eugenia A. Jones
Attorney, Agent, or Firm—David D. Kaufman

[57] ABSTRACT

Apparatus for making a duplicate key when an original key is unavailable wherein the notches in the blade of the key correspond to predetermined coded depth and spacing information. An index card having indexes thereon corresponding to predetermined coded depth and spacing information is inserted into a housing and a key having a blank blade is inserted into a key holder where it is held in a series of predetermined positions relative to a key nipping tool and corresponding to the coded depth and spacing information on the index card. Key blank positioning is indicated by a pair of pointers having arcuate movement corresponding to the coded indicia on the index card. The key blank is positioned, in accordance with the coded indicia on the index card, by linear movement of a key carrying carriage in both lateral and longitudinal directions relative to the key nipping tool, with such lateral and longitudinal movement corresponding to the depth and spacing therebetween of notches placed on the key blade and also corresponding to the arcuate movement of the pointers. Notches are placed in the key blade by depressing a handle which rotates a rocker assembly which in turn actuates a slide bar that draws the nipping tool down to engage the key blade. Cutting is facilitated by a ball and spring shock absorbing assembly located under the key carrying carriage which assembly also facilitates smooth movement of the carriage.

7 Claims, 5 Drawing Sheets

Fig. 3.

KEY PUNCH MACHINE

FIELD OF THE INVENTION

The present invention relates to the duplication of keys; and more particularly to a key blank nipping apparatus for key duplication from a predetermined code when an original key is unavailable and without the need for the use of a typical motorized grinding wheel.

BACKGROUND OF THE INVENTION

It is well-known in the key art that certain types of keys are coded in a predetermined manner. That is, keys of the type having a plurality of spaced notches of varying depth and spacing therebetween are coded by the key manufacturer to predetermined coded depths and spacing. This information is generally available to those in the key duplication trade. There have been a number of key cutting apparatus that use this predetermined code information to fashion duplicate keys from key blanks without the need of an existing key as a guide.

Examples of a key decoding apparatus by which the code of a given key can be decoded and a key duplicating apparatus by which such keys can be duplicated are disclosed in U.S. Pat. Nos. 4,012,991; 4,090,303; and 4,117,763. As more fully discussed in the '991 and '303 patent disclosures, key decoding apparatus are presently known wherein a key may have its code determined by measuring the depth of cut in association with index cards having notch spacings preindexed thereon for the spacing code of the manufacturer of the key being decoded. Once the key notch spacing and depth information is ascertained for a given key, the key can then be duplicated by the apparatus of the aforementioned patent disclosures as disclosed in the '763 patent by way of example.

In accordance with the method and apparatus of the '763 patent, once the code for depth and spacing of a given manufacturer's key has been determined, either by using the decoding apparatus discussed or having an index card with the manufacturer's code already applied thereon, the index card may be inserted into a windowed slot on the key grinding machine. The key is moveable relative the grinding wheel in predetermined manner in response to visual observation of pointers which move over the index card beneath the window so that the operator can effect the desired depth of cut and spacing of notches as provided by the code. Specifically, the blank key is located on a housing of the grinding machine in a manner related to the coded spacing of the notch to be cut by a visual observation of a first pointer sweeping across the index card. A notch is then cut at the proper location on the key to the coded depth also determined by a visual observation of a second pointer sweeping across the same index card. Sequential cuts are made in like manner. The key duplicating apparatus of these patents is fairly complex and, while providing the advantages of key duplication to a manufacturer's code provided on index cards, is relatively expensive to own by a key duplicator who might not have the volume of key duplications to justify the expense of such a sophisticated key duplicating apparatus.

SUMMARY OF THE INVENTION

Accordingly, it is an object of the present invention to disclose and provide an apparatus for duplicating keys from a predetermined set of codes that is economically constructed and simply operated and that reliably performs key blade notches of the desired depth and spacing.

It is yet another object of the invention to provide such an apparatus for duplicating keys from a predetermined set of codes that accurately and efficiently converts coded notch depth and spacing information into appropriate positioning of the key blade without the need for the space requirements and costs of typical motorized grinding wheel assemblies.

It is still another object of the invention to provide such a key duplicating apparatus that allows for continuously variable positioning of the key blank.

It is a further object of the present invention to provide such a key duplicating apparatus that reduces stress and shock forces on the clamping and cutting components of the apparatus.

It is yet another object of the invention to provide such a key duplicating apparatus that produces a smoother cut in the key blade and reduces the possibility of spalling or ragged cuts during the notching process.

It is still another object of the present invention to provide such a key duplicating apparatus that permits smoother and better controlled movement of the key blank positioning portion of the apparatus.

Generally stated, the present invention in a key punch machine includes the provision of a vertically reciprocating key nipping tool which is easily manually reciprocated in a vertical direction adjacent the edge of a key blank to progressively nip portions of the key blank away from the key to provide a desired key notch. The depth and spacing of such notch may be accomplished in accordance with the present invention through the use of indicating means associated with the apparatus and an associated key coded index card for directing the manual adjustment of the key blank relative to the vertically reciprocal nipping tool.

More specifically, the apparatus of the present invention includes a housing means including a card receiving slot for removably receiving a coded index card, a key blank holding means for holding a key blank securely, positioning means associated with such holding means for moving the key blank in lateral and longitudinal selectable amounts of movement relative the aforementioned nipping tool and indicating means to provide a visual indication (relative a coded indicia bearing index card) of the position of the key blank relative the nipping tool of the notch nipping means.

More specifically, the key blank positioning means of the present invention is provided for independently and continuously varying the lateral and longitudinal positioning of the key blank holding means relative to the nipping means, shock absorbing means are provided in association with the housing for reducing stress and shock forces between the key blank positioning means, holding means and the notch nipping means during the key cutting-nipping engagements between the nipping tool and the key blank and both first and second pointers are provided as a part of the indicating means to provide for visual indication of the depth of cut and spacing of notches being accomplished by the operation of the nipping means, the latter being simply operated by a manually operated handle. Such handle or lever operates through a slide bar and cam follower-pin assembly to draw the nipping tool in its vertical reciprocating movement down against portions of the blade of the key blank to snip portions of the key blank away in a progressive notch forming mode.

A more complete understanding of the present invention, as well as an appreciation for additional objects and advantages thereof, will be afforded to those skilled in the art from a consideration of the following detailed description of preferred exemplary embodiments thereof. Reference will be made to the appended sheets of drawings whose figures will be initially briefly described.

BRIEF DESCRIPTION OF THE DRAWINGS

FIG. 6 is a view taken along lines VI—VI cf FIG. 4;

DESCRIPTION OF AN EXEMPLARY PREFERRED EMBODIMENT

Figures 1, 2:
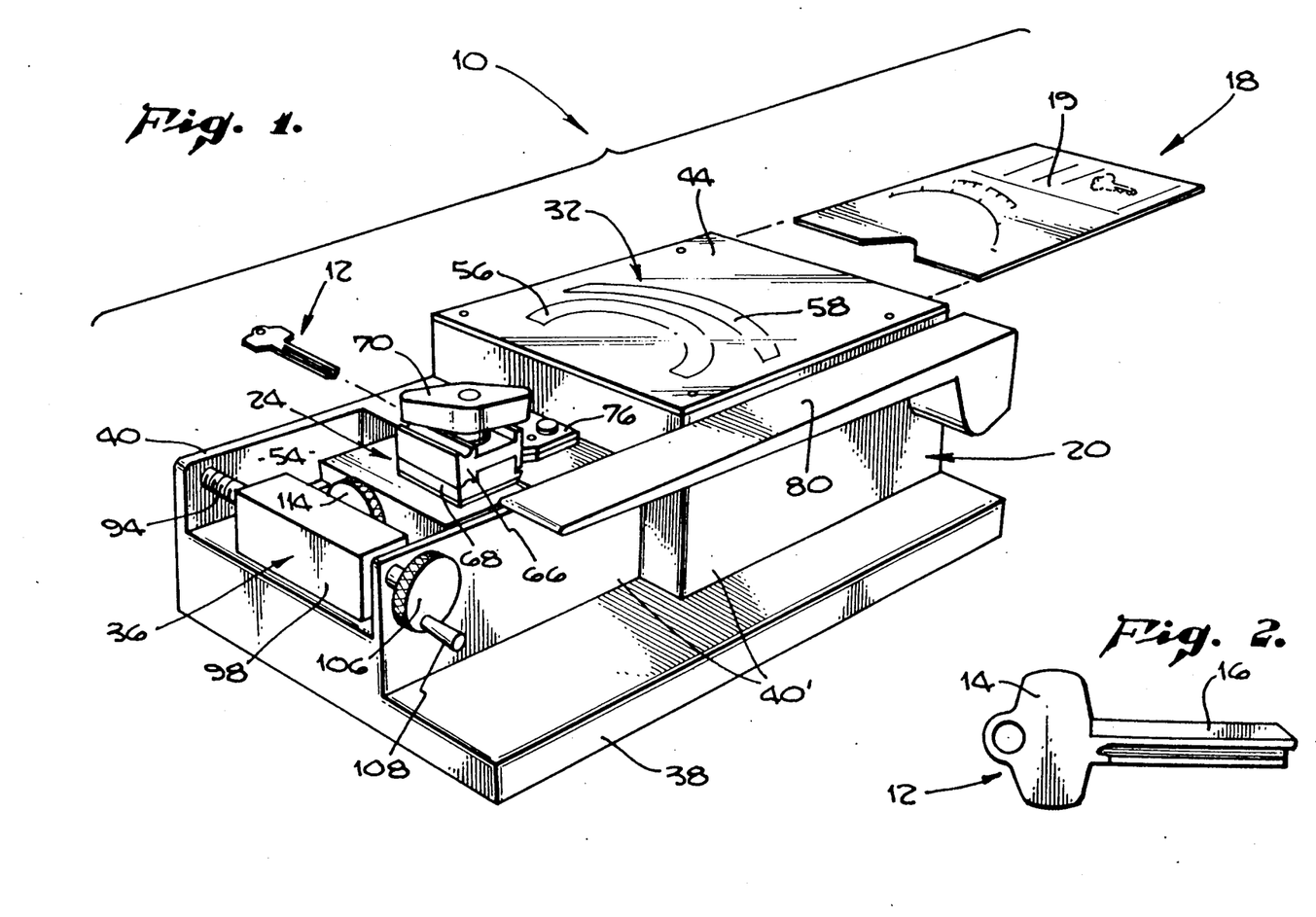
FIG. 1 is a perspective view of the key nipping apparatus in accordance with the principles of the present invention.
FIG. 2 is a top plan view of a typical key blank in its pre-cut condition.
Figures 7, 8, 9:
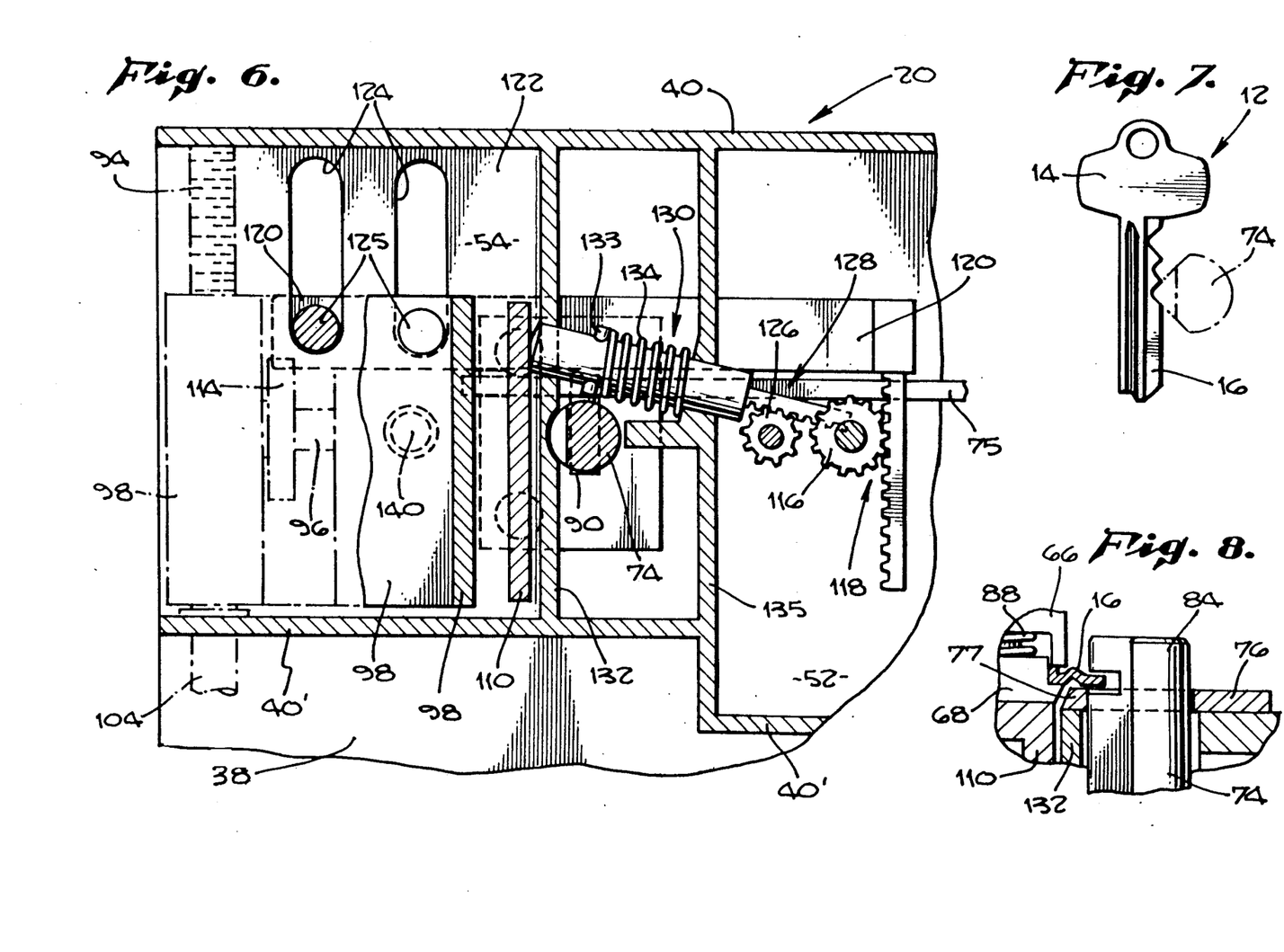
FIG. 7 is a top plan view of a key blank and key nipping tool showing several notches in the blank's blade.
FIG. 8 is a partial cross-sectional view of the clamp assembly and nipping tool of a preferred exemplary embodiment of the present invention showing a clamped key blank prior to nipping action.
FIG. 9 is a view taken along lines IX—IX of FIG. 3.
Figures 9, 10, 11:
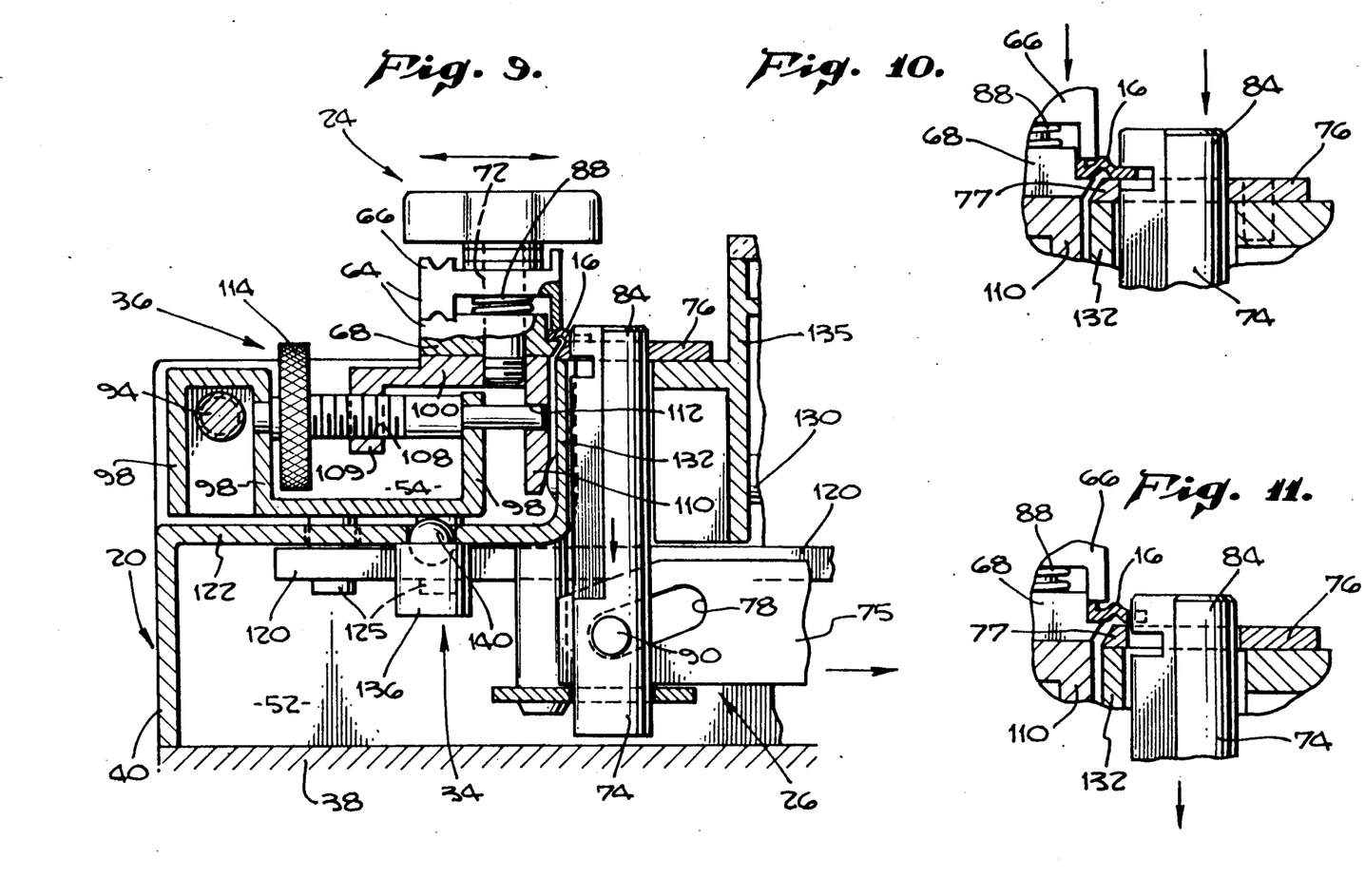
FIG. 10 is a partial cross-sectional view of the clamp assembly and nipping tool of a preferred exemplary embodiment of the present invention showing a clamped key blank during a nipping action.
FIG. 11 is a partial cross-sectional view of the clamp assembly and nipping tool of a preferred exemplary embodiment of the present invention showing a clamped key blank after a nipping action.

Referring now to the drawings, FIG. 1, as particularly contemplated in the present invention, shows a key duplication apparatus 10 for duplicating keys from a predetermined code when an original key is unavailable. As will be discussed, and as is best seen in FIGS. 2 and 7, the key blank 12 on which the key duplicating apparatus 10 operates is a standard key blank having a head 14 and a blade portion 16 along which a plurality of notches of specific depth and spacing therebetween will be made. Further, the key of which a duplicate is desired is of a particular type from a particular manufacturer who provides keys having notches of predetermined coded depths and spacing. Hence, either the coded key-type or the manufacturer of the key is known beforehand.

Figure 3:
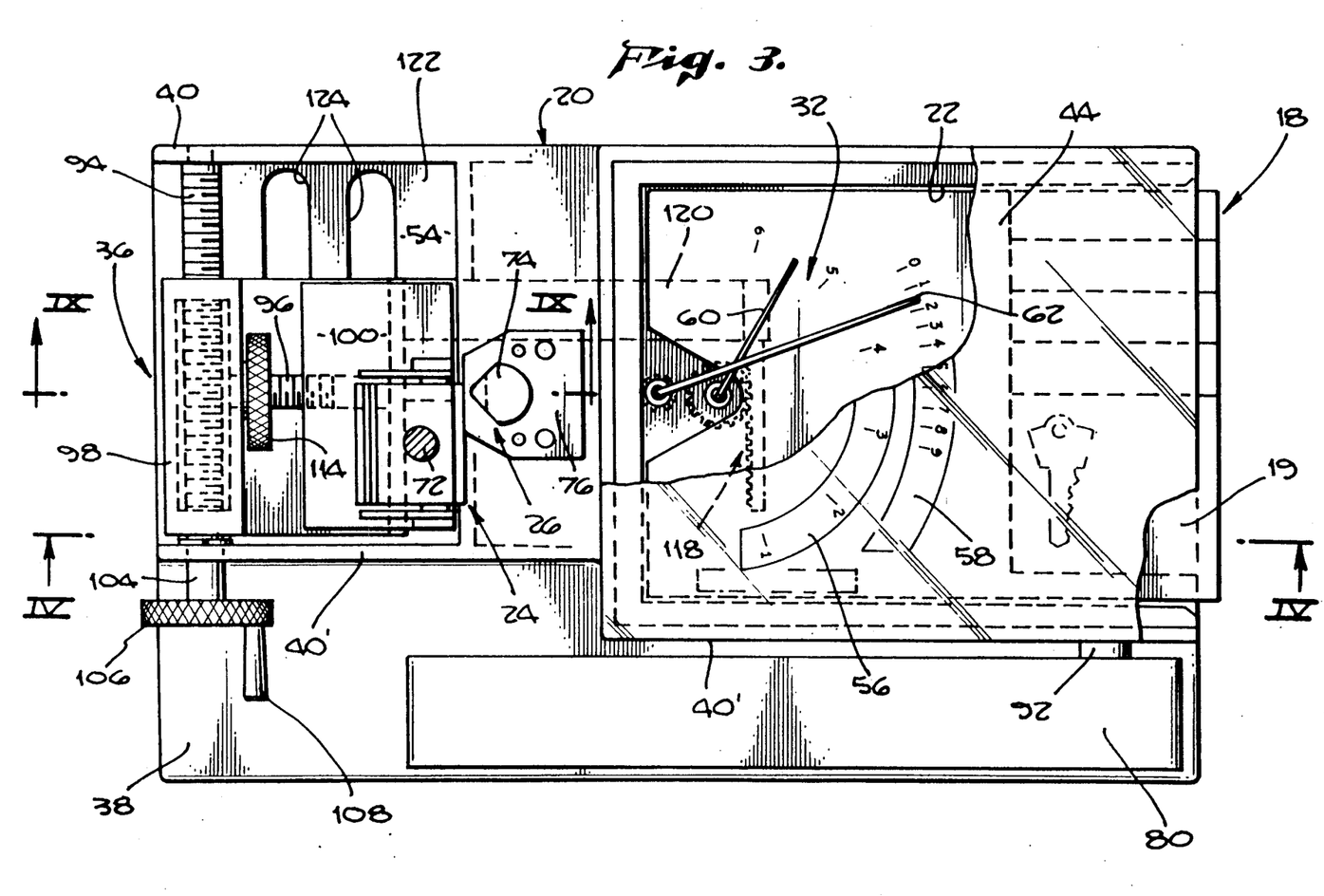
FIG. 3 is a top plan view, partially in section, of a preferred exemplary embodiment of the key nipping apparatus in accordance with the principles of the present invention.

Such information is generally available to those in the key duplicating art. Accordingly, as shown in FIGS. 1 and 3, coded indicia bearing means 18 in the form of a plurality of index cards are provided. Such index cards may have coded information recorded thereon relating to one or more coded key-types.

Referring more particularly to FIGS. 1 through 11, as particularly contemplated in the present invention, a duplicating apparatus 10 is shown including the aforementioned coded indicia bearing means 18; housing means 20 including a card receiving slot 22 for removably receiving coded indicia bearing means 18 therein; key blank holding means 24 for holding a key blank 12 having a blank blade portion 16 in a predetermined position relative to housing means 20; notch nipping means 26 for nipping notches in blade portion 16 of key blank 12; key blank positioning means 36 for moving blank blade portion 16 of key blank 12 held in the key blank holding means 24 into a sequence of lateral and longitudinal positions relative to cutting engagement with notch cutting means 26 and corresponding to the coded depth and spacing information on coded indicia bearing means 18; and indicating means 32 within housing means 20 and viewable from outside the housing for continuously indicating the position of key blank 12 held in key blank holding means 24 and continuously indicating the depth and spacing of notches being cut into blank blade portion 16 of key blank 12. Also, key duplicating apparatus 10 may include shock absorbing means 34 for absorbing and dissipating the shock and stress forces generated by the cutting action of notch nipping means 26 and for facilitating movement of key blank positioning means 36 relative to housing means 20.

Figure 4:
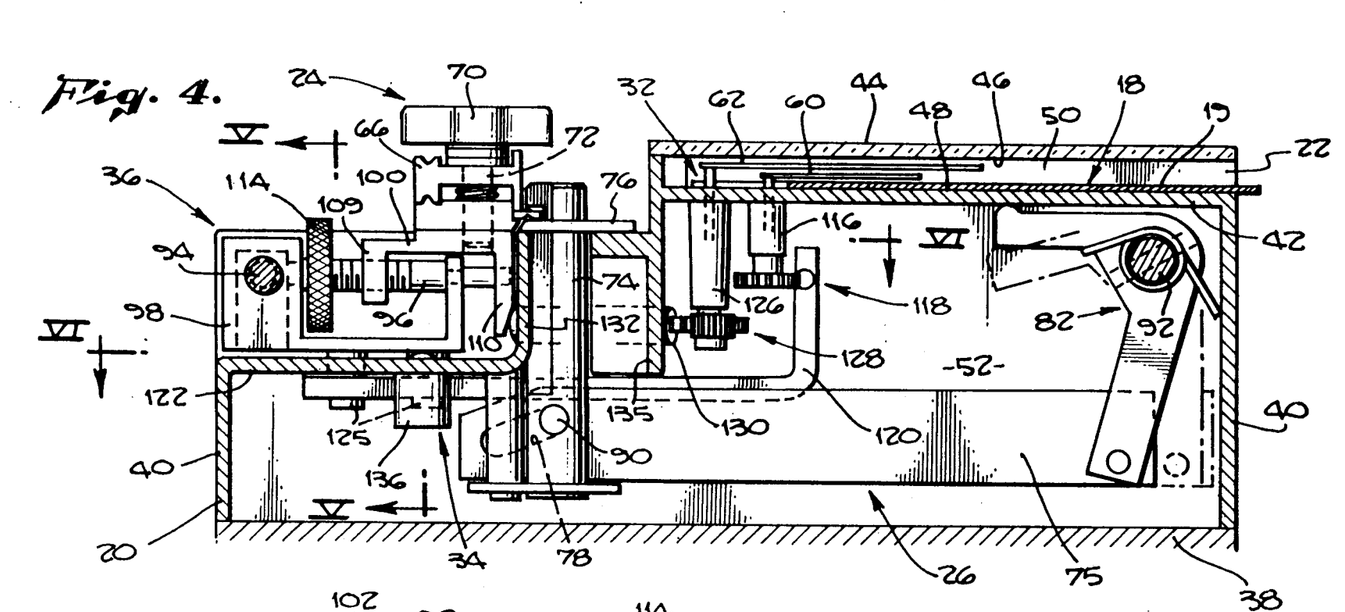
FIG. 4 is a view taken along lines IV—IV cf FIG. 3.
Figure 5:
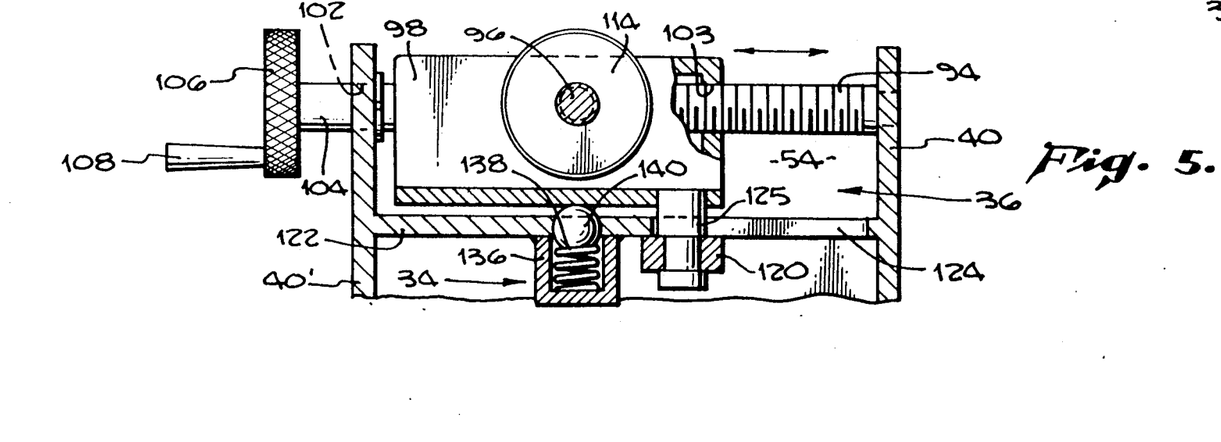
FIG. 5 is a view taken along lines V—V of FIG. 4.

Accordingly, referring again to FIGS. 1 through 11, key duplicating apparatus 10, in the exemplary embodiment of the invention, includes housing means 20 which may be formed of any suitable material such as plastic, cast aluminum, etc. Housing means 20 includes a base 38, side walls 40, an inner wall 42, and a cover member 44. For reasons to be discussed, cover member 44 has clear or transparent windows 56, 58 and is secured to side walls 40 by suitable screws or the like. As shown in FIGS. 3 and 5, portions of the side walls 40 along with the lower surface 46 of cover member 44 and the upper surface 48 of inner wall 42 combine to form an inner cavity 50 suitable to receive coded indicia bearing means 18 therein. Card receiving slot 22 in side wall 40 allows insertion of coded indicia bearing means 18 into inner cavity 50. A second, larger inner cavity 52 is formed on the base 38 and, as discussed hereinbelow, portions of indicating means 32, shock absorbing means 34 and notch nipping means 26 are contained within it. Also, a portion of base 38 and side walls 40 are formed into an outer recess 54 within which rests key blank positioning means 36, key blank holding means 24, and portions of shock absorbing means 34 and notch nipping means 26.

As is best seen in FIG. 1, coded indicia tearing means 18 is in the form of an index card 19 having indicia thereon relating to coded notch depths and spacing therebetween of various key-types.

As shown in FIG. 1, an index card 19 is about to be inserted in slot 22 and into cavity 50. As shown in FIG. 3, card 19 is inserted into cavity 50 so as to align the coded indicia on card 19 with transparent windows 56 and 58. As can be seen in FIG. 4, the spacing formed between lower surface 46 of cover member 44 and the upper surface 48 of inner wall 42 is sufficiently large to permit insertion of card 19 into cavity 50 and still leave room between the card 19 and lower surface 46. As will be discussed, this spacing allows movement of indicator pins or pointers 60, 62, associated with indicating means 32, to sweep across the coded indicia on card 19.

Referring now to FIGS. 1, 4 and 9, key blank holding means 24 is illustrated for holding a key blank 12 with a blank blade portion 16 in a predetermined relationship with housing means 20. As particularly contemplated in the present invention, holding means 24 is mounted on key blank positioning means 36 and includes a clamp 64 having upper 66 and lower 68 members threaded on shaft 72 with one end rotatably mounted upon key blank positioning means 36. A clamp handle 70 is affixed to the other end of shaft 72. A gap is formed between upper and lower clamp members 66 and 68 on the side of clamp 64 adjacent notch nipping means 26. As particularly contemplated in the present invention, key blank 12 is inserted with blank blade portion 16 facing notch nipping means 26 and with head 14 abutting clamp 64. Clamp handle 70 is then tightened and key blank 12 is fixed in position relative to key blank positioning means 36 and is automatically aligned in preparation for receiving a sequence of notches of predetermined depth and spacing therebetween. A compression spring 88, disposed along shaft 72 and between upper and lower clamp members 66 and 68, keeps the clamp members separate until clamp handle 70 is tightened.

Referring again to FIGS. 1 to 11, notch nipping means 26 is illustrated for nipping notches of predetermined depth and spacing therebetween on blank blade portion 16 of key blade 12. As particularly contemplated in the present invention, notch nipping means 26 includes a nipping tool 74, a combination anvil/collar 76 adjacent nipping tool 74, a slide bar 75 having a cam follower slot 78 formed therein, a handle 80, and a linkage assembly 82 between slide bar 75 and handle 80. Nipping tool 74 is constrained to essentially one direction of motion by side walls 40 of housing means 20 and also by anvil/collar 76 which is affixed to housing means 20 by suitable screws or the like and which closely surrounds the upper end 84 of nipping tool 74. As is shown in FIG. 4, the lower end 76 of nipping tool 74 has a cam follower pin 90 formed thereon and which slidably engages cam follower slot 78. As is best seen in FIGS. 1 and 4, handle 80 is depressed thereby rotating linkage assembly 82 about linkage pin 92 which in turn draws slide bar 75 rearwardly through large inner cavity 52. Cam follower pin 90 is slidably drawn down by cam slot 78 and nipping tool 74 is in turn pulled down to engage blank blade portion 16 and cut a notch of predetermined depth.

Referring further to FIGS. 1, 4 and 9, key blank positioning means 36 is illustrated for positioning key blank 12 having a blank blade portion 16 for cutting engagement with notch nipping means 26 and for receiving a sequence of notches thereon of predetermined depth and spacing therebetween in accordance with coded indicia on card 19. Key blank positioning means 36 is disposed generally in outer recess 54 and includes first and second threaded shafts 94, 96 oriented perpendicular to one another, main carriage 98 mounted on and threadably engaging shaft 94 and sub-carriage 100 mounted on and threadably engaging second shaft 96 which in turn is mounted on main carriage 98. One end of first shaft 94 is rotatably affixed to side wall 40 and the other end is threaded in a first threaded aperture 102 in side wall 40'. Shaft 94 extends past side wall 40' and terminates in a sleeve member 104 which abuts against side wall 40'. A first knurled knob 106 is fixedly secured to sleeve member 104 and may have a handle 108 thereon to assist in rotating shaft 94. Main carriage 98 threadably engages first shaft 94 and, as best seen in FIG. 5, main carriage 98 is carried along first threaded shaft 94 when shaft 94 is rotated via knob 106.

Further, as shown in FIG. 9, one end of second threaded shaft 96 is rotatably affixed to a portion of main carriage 98 and the other end is threaded in a second threaded aperture 112 in a downwardly extending wall 110 of sub-carriage 100. A second knurled knob 114 is fixedly secured to second threaded shaft 96 and, as clearly shown in FIG. 9, sub-carriage 100, to which key blank holding means 24 is fixedly secured, is carried along second threaded shaft 96 when shaft 96 is rotated via knob 114. Hence, it is seen that, relative to nipping tool 74, the position of blank blade portion 16 of key blank 12 held in key blank holding means 24 may be varied by rotating knurled knobs 106 and 114. More particularly, second knob 114, which actuates movement of sub-carriage 100 on which is affixed key blank holding means 24, controls the notch depth positioning of blank blade portion 16 of key blank 12 relative to notch nipping tool 74, and first knob 106, which actuates movement of main carriage 98 on which sub-carriage 100 is mounted, controls the notch spacing positioning of blank blade portion 16 of key blank 12 relative to notch nipping tool 74.

Referring now to FIGS. 3, 4 and 6, indicating means 32 is illustrated for continuously indicating the depth and spacing therebetween of notches to be made in blank blade portion 16 of key blank 12 corresponding to coded depth and spacing indicia on indicia bearing means 18, and for continuously indicating the position of blank blade portion 16 of key blank 12. As particularly contemplated in the present invention, indicating means 32 includes first and second pointers 60 and 62, each pointer movable across the coded indicia on coded index card 19 and with first pointer 60 adapted to indicate notch spacing information and second pointer 62 adapted to indicate notch depth information. As is shown in FIG. 4, first pointer 60 is pivotally mounted on first shaft 116 which is rotatably connected via first rack and gear assembly 118 (see FIG. 6) to first movable member 120 fixedly secured to the underside of main carriage 98 of key blank positioning means 36. First movable member 120 is disposed entirely within larger inner cavity 52 and is affixed to main carriage 98 by pins or other suitable fasteners 125 that extend through the floor 122 of outer recess 54 to the base of main carriage 98. As seen in FIGS. 3 and 4, slots 124 are provided in floor 122 of outer recess 54 to accommodate movement of the fasteners when main carriage 98 is carried along threaded shaft 94. As particularly contemplated in the present invention, linear movement of main carriage 98 of key blank positioning means 36 is translated into arcuate movement of first pointer 60 across the face of coded index card 19.

As shown in FIGS. 4 and 6, second pointer 62 is pivotally mounted on second shaft 126 which is rotatably connected via second rack and gear assembly 128 to shaft assembly 130 that engages a wall of sub-carriage 100 of key blank positioning means 36. Shaft assembly 130 extends from second rack and gear assembly 128 through side wall 40 of housing means 20 and through rear wall 132 of outer recess 54 to downwardly extending wall 110 of sub-carriage 100. Shaft assembly 130 may include compression spring 134, disposed between step 133 and cavity wall 135 to maintain proper tension between downwardly extending wall 110 of sub-carriage 100 and the end of shaft assembly 130 engaging second rack and gear assembly 128. As particularly contemplated in the invention, linear movement of sub-carriage 100 of key blank positioning means 36 is translated into arcuate movement of second pointer 62 across the face of coded index card 19. Also, as hereinbefore discussed, first and second pointers 60 and 62, are disposed in the spacing between the upper surface of index card 19 and the lower surface 46 of cover member 44. Further, first and second pointers 60 and 62, are mounted so as to allow one pointer to sweep under the other (see FIG. 4) and thereby not interfere with each others movement.

Referring now to FIGS. 5 and 9, shock absorbing means 34 is illustrated for dissipating the stress and shock forces generated at the instant of cutting engagement between nipping tool 74 and blank blade portion 16 of blank key 12, and for providing more positive engagement between blank blade portion 16 and the anvil portion of anvil/collar 76. As particularly contemplated in the present invention, shock absorbing means 34 includes a detent or cup 136 formed in the floor 122 of outer recess 54 within which sits a compression spring 138 and ball 140. Ball 140 sits atop spring 138 and extends slightly above the upper surface 142 of floor 122 to engage the bottom of main carriage 98 and provide upwardly directed pressure against main carriage 98. When nipping tool 74 is brought into cutting engagement with blank blade portion 16 of key blank 12, the upward pressure may be overcome by the downward pull of nipping tool 74 thereby creating a shock absorbing effect by ball blade portion 16 is brought into positive engagement with anvil portion 77 of anvil/collar thereby allowing a smoother and more even cut. Also, ball 140 is in rolling engagement with the bottom of main carriage 98 and this facilitates smooth movement of main carriage 98 when knob 106 is turned.

It can be seen from the foregoing that we have disclosed an efficient, easy to use apparatus for making a duplicate key from coded notch depth and spacing information when an original key is not available. With this apparatus, notch depth and spacings may be continuously varied according to predetermined coded information and accurate duplicate keys may be inexpensively produced.

We claim:
1. Apparatus for duplicating a key having a blade portion with a plurality of spaced transverse notches of differing depths and spacing therebetween, said notches being coded to predetermined coded depth and spacing information, said predetermined coded depth and spacing information being recorded in sequential indexes corresponding to said coded depth and spacing information on coded indicia bearing cards, said apparatus comprising:
   housing means including a card receiving slot for removably receiving said cards therein;
   key blank holding means associated with said housing means for holding a key blank having a blank blade portion in a predetermined relationship thereon;
   notch nipping means associated with said housing means and adapted to nip out portions of said blank to thereby cut a notch in said blank blade portion;
   key blank position means associated with said housing means and having said key blank holding means affixed thereon for movign said key blank having a blank blade portion into cutting engagement with said nipping means; and
   indicating means provided within said housing means and visually observable from the exterior of said housing for continuously indicating the position of said key blank having a blank blade portion and continuously indicating the depth and spacing therebetween of notches to be cut in said blank blade in comparison with said coded depth and spacing indicia on said cards,
   said notch nipping means including a nipping tool constrained to reciprocating motion with respect to said housing means in substantially one direction and a slidable bar constrained to reciprocating motion with respect to said housing means in a direction substantially perpendicular to the motion of said nipping tool, said nipping tool including a cam-follower-pin affixed thereon and said slidable bar including a cam-follower-slot constructed and arranged for receiving said cam-follower-pin wherein movement of said slidable bar displaced said cam-follower-pin so as to move said nipping tool into cutting engagement with said blank blade portion of said key blank.

2. The apparatus of claim 1 wherein said notch nipping means further includes handle means operatively connected with said slidable bar for actuating movement of said slidable bar.

3. The apparatus of claim 2 wherein said key blank positioning means includes means for independently and continuously varying the lateral and longitudinal positioning of said key blank holding means relative to cutting engagement with said nipping means.

4. The apparatus of claim 3 further including shock absorbing means associated with said housing means, said key blank position means, said key blank holding means, and said notch nipping means for reducing stress and shock forces between said key blank positioning means, said key blank holding means, and said notch nipping means upon nipping engagement between said blank blade portion in said holding means and said notch nipping means.

5. The apparatus of claim 4 wherein said shock absorbing means includes a vertically oriented ball and spring assembly between said key blank positioning means and said housing means whereby said key blank positioning means is in rolling engagement with the ball of said ball and spring assembly, and the spring of said ball and spring assembly has a first end rollingly engaging said ball and a second end engaging said housing means.

6. The apparatus of claim 5 wherein said ball and spring assembly applies upwardly directed pressure against said key blank holding means affixed to said key blank positioning means whereby said blank blade portion of said key blank is biased in a spaced relationship from said nipping means, said upward pressure being overcome when said nipping means engages said blank blade portion of said key blank.

7. The apparatus of claim 6 wherein said indicating means includes:
   a first pointer movable across the coded depth indicia on said indicia bearing card means, said first pointer being pivotally mounted on a first shaft rotatably connected to a spring loaded movable member mounted in said housing means, said spring loaded movable member operatively engaging said key blank positioning means whereby linear movement of said lateral key blank positioning means results in a corresponding arcuate movement of said first pointer, and
   a second pointer movable across the coded spacing indicia on said indicia bearing card means, said second pointer being pivotally mounted on a second shaft rotatably connected to a first movable member, said first movable member affixed to a second movable member said first and second movable members mounted in said housing means, and said second movable member operatively engaging said key blank positioning means whereby linear movement of said longitudinal key blank positioning means results in a corresponding arcuate movement of said second pointer.

* * * * *

UNITED STATES PATENT AND TRADEMARK OFFICE
CERTIFICATE OF CORRECTION

PATENT NO. : 5,054,350
DATED : October 8, 1991
INVENTOR(S) : Klaus W. Gartner and Alan K. Uyeda It is certified that error appears in the above-identified patent and that said Letters Patent is hereby corrected as shown below:

Column 4, line 49: "tearing" should be --bearing--
Column 5, line 34: "76" should be deleted
Column 7, line 26: Between "ball" and "blade" there should be inserted:

--140 and spring 138. Further, as is best seen in Fig. 8, prior to cutting engagement, the upward pressure of spring 138 and ball 140 keeps the blank blade portion 16 of key blank 12 slightly separated from anvil portion 77 of anvil/collar 76. Upon cutting engagement of nipping tool 74 and blank blade portion 16 (see Fig. 10), blank--

Column 7, line 60: "movign" should be --moving--
Column 8, line 7: Between "in" and "a" there should be inserted:

--substantially one direction and a slidable bar constrained to reciprocating motion with respect to said housing means in--

Column 8, line 13: "displaced" should be --displaces--

Signed and Sealed this

Second Day of February, 1993

Attest:

STEPHEN G. KUNIN

Attesting Officer

Acting Commissioner of Patents and Trademarks